(12) United States Patent
Aman et al.

(10) Patent No.: US 6,369,352 B1
(45) Date of Patent: Apr. 9, 2002

(54) LASER WELDING APPARATUS

(75) Inventors: Gary A. Aman, Roseville; Jimmie B. Fletcher, Waterford; James D. Scannell, Grosse Pointe Farms, all of MI (US)

(73) Assignee: Unova IP Corp., Woodland Hills, CA (US)

(*) Notice: Subject to any disclaimer, the term of this patent is extended or adjusted under 35 U.S.C. 154(b) by 0 days.

(21) Appl. No.: 09/578,772

(22) Filed: May 25, 2000

(51) Int. Cl.[7] .............................................. B23K 26/00
(52) U.S. Cl. ......................... 219/121.63; 219/121.64; 219/121.82; 219/121.78; 219/121.84
(58) Field of Search .................. 219/121.63, 121.64, 219/121.82, 121.78, 121.84

(56) References Cited

U.S. PATENT DOCUMENTS

| | | | | |
|---|---|---|---|---|
| 3,555,239 A | * | 1/1971 | Kerth | 219/125 |
| 4,229,638 A | * | 10/1980 | Lichte | 219/121 EM |
| 4,617,446 A | * | 10/1986 | Anderson | 219/121 LC |
| 5,066,846 A | * | 11/1991 | Pirl | 219/121.63 |
| 5,168,142 A | | 12/1992 | Gartner et al. | |
| 5,302,800 A | * | 4/1994 | Griffaton | 219/121.63 |
| 5,371,337 A | | 12/1994 | Campbell et al. | |
| 5,430,270 A | * | 7/1995 | Findlan et al. | 219/121.63 |
| 5,498,849 A | * | 3/1996 | Isshiki et al. | 219/121.64 |
| 5,659,479 A | | 8/1997 | Duley et al. | |

* cited by examiner

Primary Examiner—M. Alexander Elve
(74) Attorney, Agent, or Firm—Reising, Ethington, Barnes, Kisselle, Learman & McCulloch, P.C.

(57) ABSTRACT

A rotary welding apparatus for joining two metallic workpieces together by forming a semi-circular weld at a semi-circular interface formed at mating surfaces of the workpieces. A turntable is rotated by a turntable drive. The turntable supports and indexes three lower tools around a circular path between a load station and a weld station. Each lower tool supports two workpieces to be welded together. A workpiece rotary drive connects to whichever of the lower tools is at the weld station then rotates that lower tool about a workpiece axis. A laser emitter supported adjacent the weld station directs a laser beam at a circular or semi-circular interface between respective mating surfaces of the two workpieces and welds the workpieces together as the workpiece rotary drive rotates them. The laser emitter is supported on a laser emitter mount near the weld station in a position directing a laser beam at the interface of the workpiece mating surfaces. The laser emitter mount has two support points spaced radially from each other relative to the laser emitter to stabilize the laser emitter for improve welding accuracy.

36 Claims, 11 Drawing Sheets

LASER WELDING APPARATUS

TECHNICAL FIELD

This invention relates generally to a rotary welding apparatus for joining two metallic workpieces together by forming a circular or semi-circular weld at a semi-circular interface formed at mating surfaces of the workpieces.

BACKGROUND OF THE INVENTION

Welding machines that join metallic workpieces together by forming circular or semi-circular welds at circular or semi-circular interfaces formed at mating surfaces of the workpieces are known in the art. Some of these machines are known to rotate workpieces on a common central axis while directing a laser beam at a circular or semi-circular interface between respective mating surfaces of the workpieces. The laser beam melts the first and second workpieces along the respective mating surfaces and welds the first and second workpieces together forming a circular or semi-circular weld along the circular or semi-circular interface.

It is also known for a rotary welder to include a turntable supported for rotation about a turntable axis and rotatably driven by a turntable drive. A lower tool is supported on the turntable and supports workpieces for coaxial rotation about a workpiece axis that extends through both workpieces. The turntable and lower tool support the workpieces for indexed movement along a circular workpiece path around the turntable axis between a load station and a weld station. A workpiece rotary drive connects to the lower tool when the lower tool is disposed at the weld station and rotates the lower tool about the workpiece axis. A laser emitter is supported adjacent the weld station and directs a laser beam from a laser generator toward a circular or semi-circular interface between respective mating surfaces of the workpieces as the workpiece rotary drive rotates the lower tool about the workpiece axis. The laser emitter is suspended over the turntable on an arm of a laser emitter mount. The laser emitter mount has a single support point displaced laterally from the laser emitter and outside the turntable. This laser emitter mounting arrangement allows a small but significant amount of movement between the laser emitter and the target workpieces during welding which can reduce the precision of the welding operation.

In addition, it is known to include a rotary drive that, in addition to engaging and rotating a lower tool, raises the tool to a welding position within a stationary shroud before lasing. Such shrouds are designed to protect the eyes of operators and bystanders by blocking laser energy reflected from the workpieces during welding. The rotary drive includes a vertically reciprocating pedestal that engages whichever of the tools is located at the weld station and lifts that tool and its supported workpieces into a shroud supported above the weld station. The pedestal rotates the tool and workpieces within the shroud. A laser emitter supported adjacent the weld station directs a laser beam from a laser generator toward a circular or semi-circular interface between respective mating surfaces of the workpieces, welding the workpieces together within the shroud.

SUMMARY OF THE INVENTION

According to the invention, a rotary welding apparatus is provided for joining two metallic workpieces together by forming a circular or semi-circular weld at a semi-circular interface formed at mating surfaces of the workpieces. A lower tool is configured to support first and second workpieces for coaxial rotation about a workpiece axis extending through the workpieces. The apparatus also includes a workpiece rotary drive operatively connectable to the lower tool and configured to rotate the lower tool about the workpiece axis. A laser emitter is supported adjacent the workpiece axis and is configured to direct a laser beam at a circular or semi-circular interface between respective mating surfaces of the first and second workpieces such that the laser beam melts the first and second workpieces along the respective mating surfaces and welds the first and second workpieces together. This forms a circular or semi-circular weld along the circular or semi-circular interface as the workpiece rotary drive rotates the lower tool about the workpiece axis. The resulting weld is coaxially disposed around the workpiece axis. A laser emitter mount is disposed adjacent the workpiece axis and includes a first support point displaced laterally from the laser emitter.

The laser emitter mount of the rotary welding apparatus also includes a second support point spaced radially from the first support point relative to the laser emitter to improve weld accuracy by positively locating the laser emitter relative to the workpieces.

Objects, features and advantages of this invention include rotatably supporting an upper tool on the head in a position to sandwich the workpieces between the upper tool and the lower tool before welding; including a gage block that advances radially inward to engage and hold a workpiece disposed on the lower tool during welding; and incorporating support shafts, guide rods and guide pins that maintain lateral positioning of the head and other components during axial movement. Other objects, features and advantages include simplifying construction and operation by supporting the upper tool and a shroud on a head member that is, in turn, supported on a stationary bridge mount for reciprocal axial motion relative to the bridge; mounting a portion of a shroud for axial movement on the head; converting axial head motion into lateral gage block motion using a gage block drive; supporting the gage blocks and gage block drives on a common platform; supporting the lower tool on a movable platform for indexed movement along a workpiece path between a load station and a weld station to facilitate rapid loading and unloading of workpieces; supporting the lower tool on a bearing ring the movable platform rather than on bearings disposed below the platform to minimize runout by reducing the vertical distance between the bearing and the interface to be welded; providing the bearing ring with a radius greater than that of the weld interface to further reduce runout by providing a broader, and therefore more stable rotating platform.

BRIEF DESCRIPTION OF THE DRAWINGS

These and other objects, features and advantages of this invention will be apparent from the following detailed description of the preferred embodiment and best mode, appended claims, and accompanying drawings in which:

DETAILED DESCRIPTION

A rotary welding apparatus for joining two metallic workpieces together by forming a circular or semicircular weld at a circular or semicircular weld interface formed at mating surfaces of the workpieces is generally shown at 10, FIGS. 1A through 3B. The apparatus 10 includes a turntable 12 supported for rotation in about a turntable axis 14. The turntable 12 is rotatably driven by a turntable drive 16.

Figure 1A:
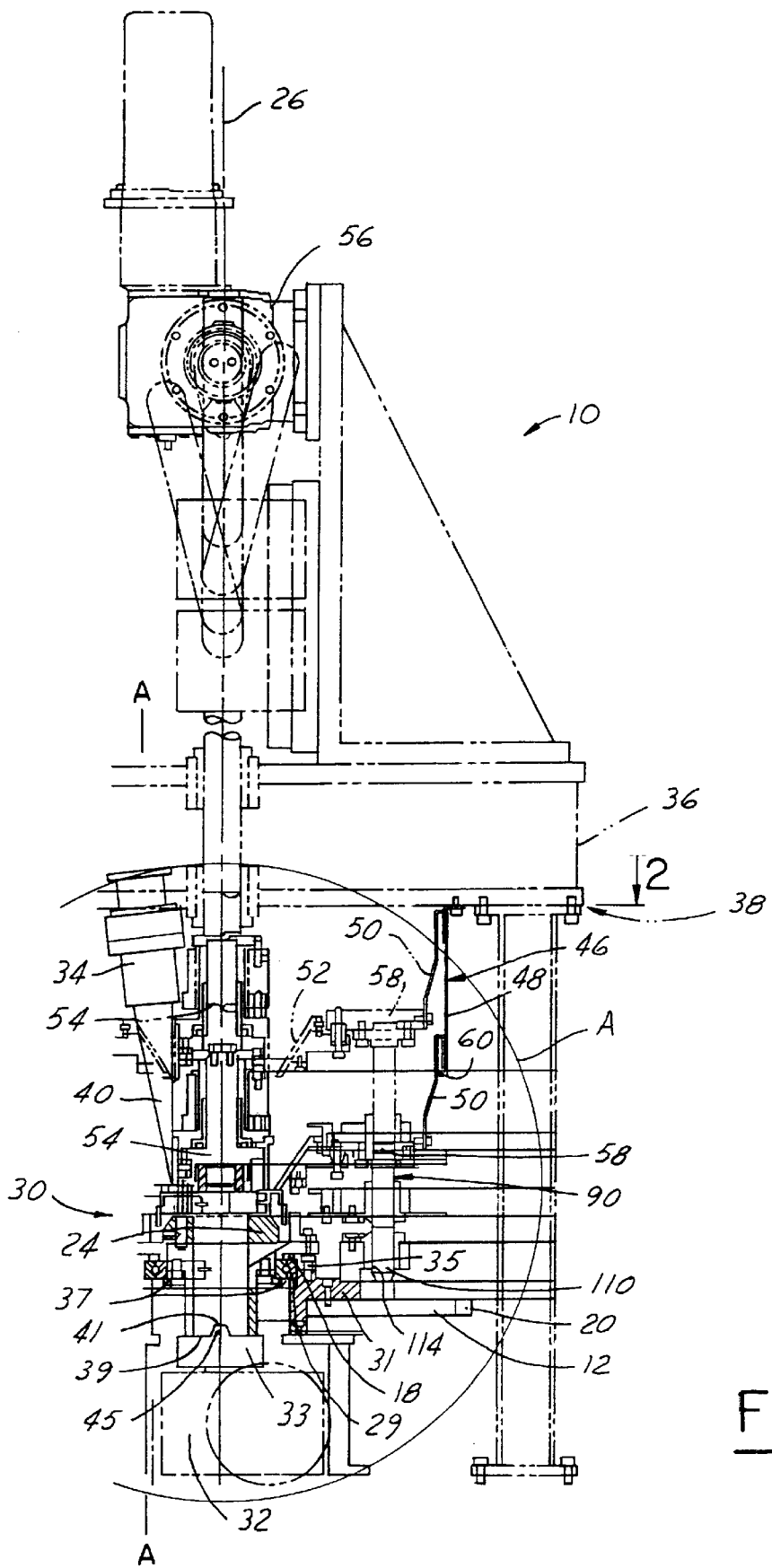
FIG. 1A is a first portion of a partial cross-sectional side view of a rotary welding apparatus constructed according to the invention.
Figure 1B:
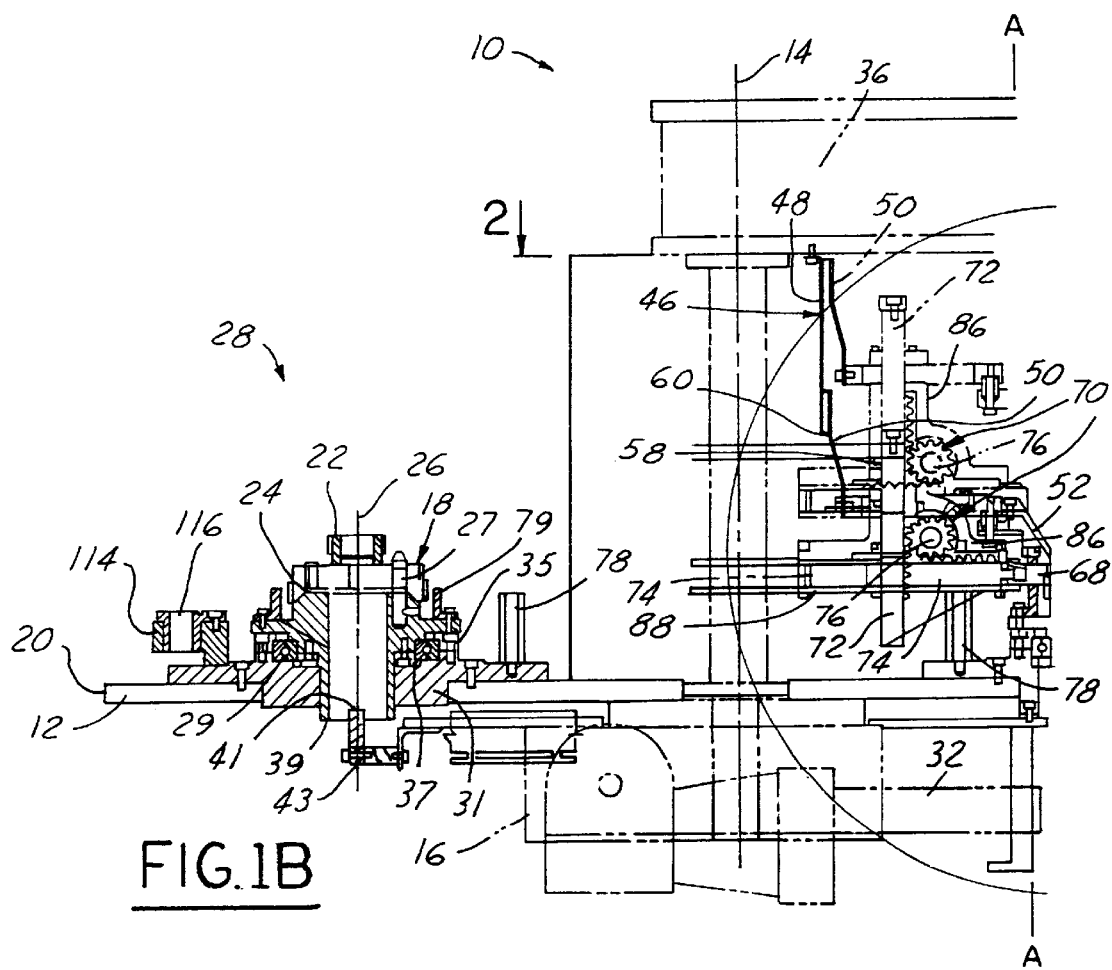
FIG. 1B is a second portion of the partial cross-sectional side view of FIG. 1A.
Figure 3A:
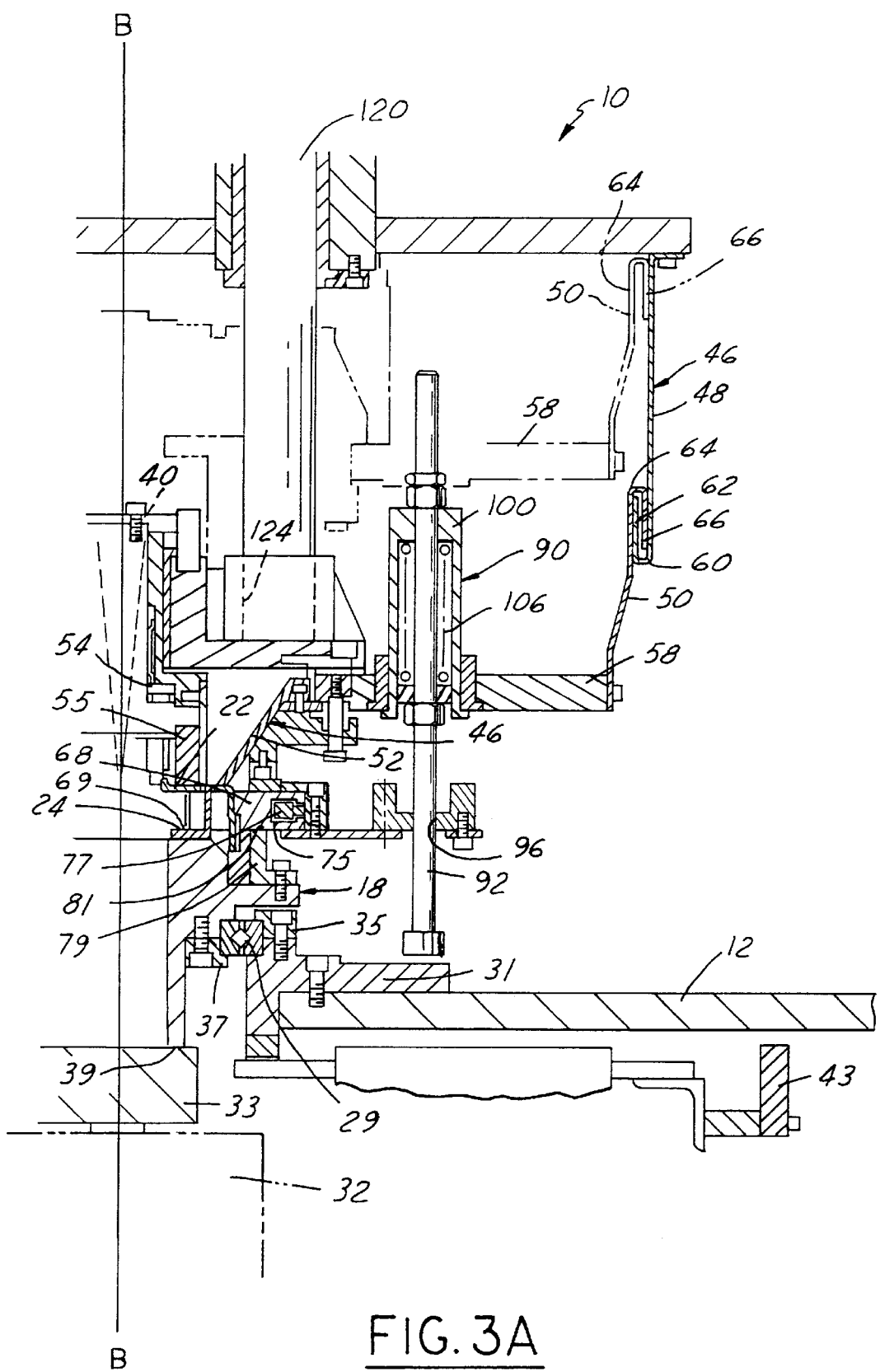
FIG. 3A is a first portion of a fragmentary partial cross-sectional front view of the rotary welding apparatus of FIGS. 1A and 1B taken along line 3A—3A of FIG. 2.
Figure 3B:
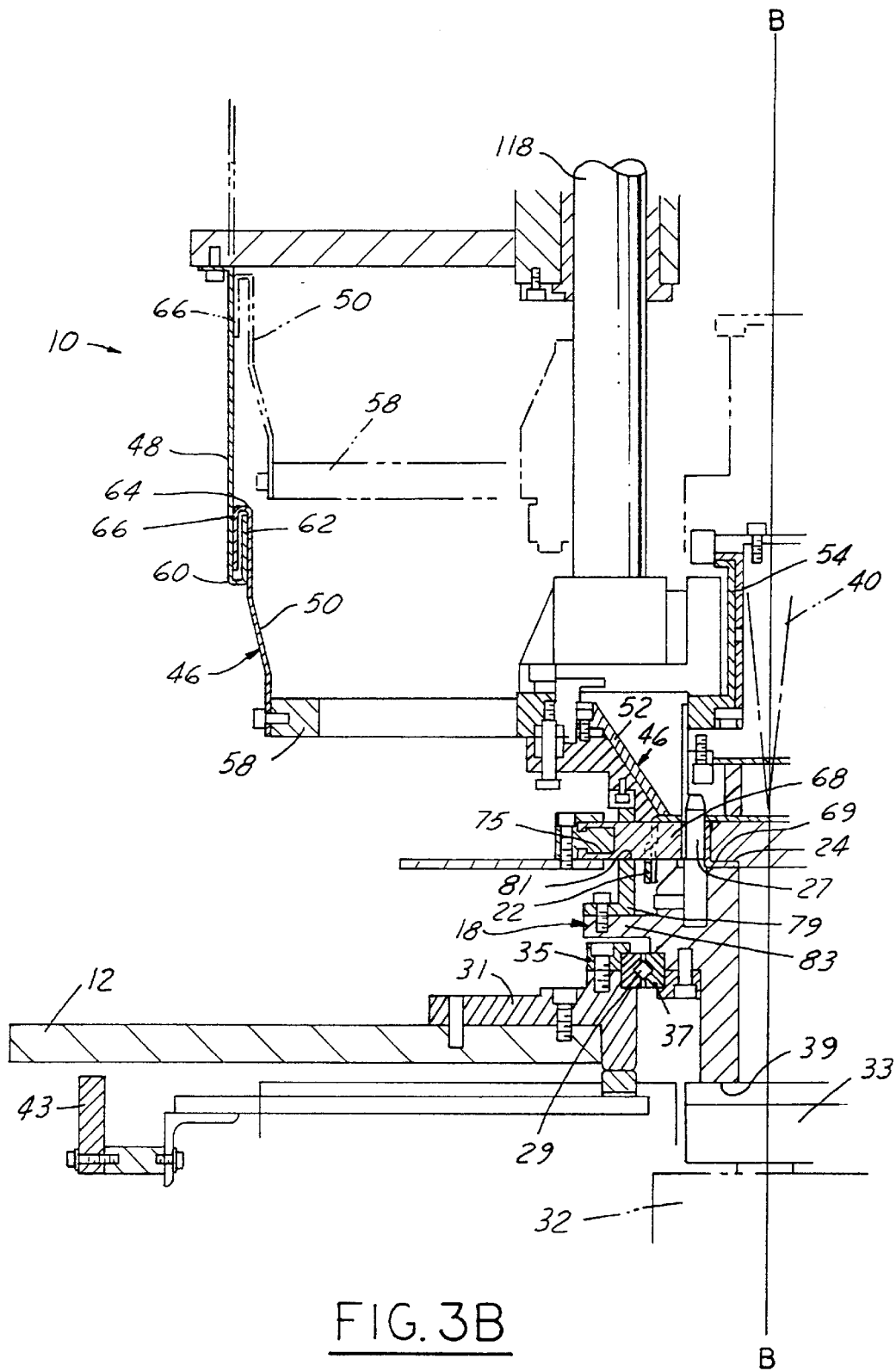
FIG. 3B is a second portion of the fragmentary partial cross-sectional front view of FIG. 3A.
Figure 4:
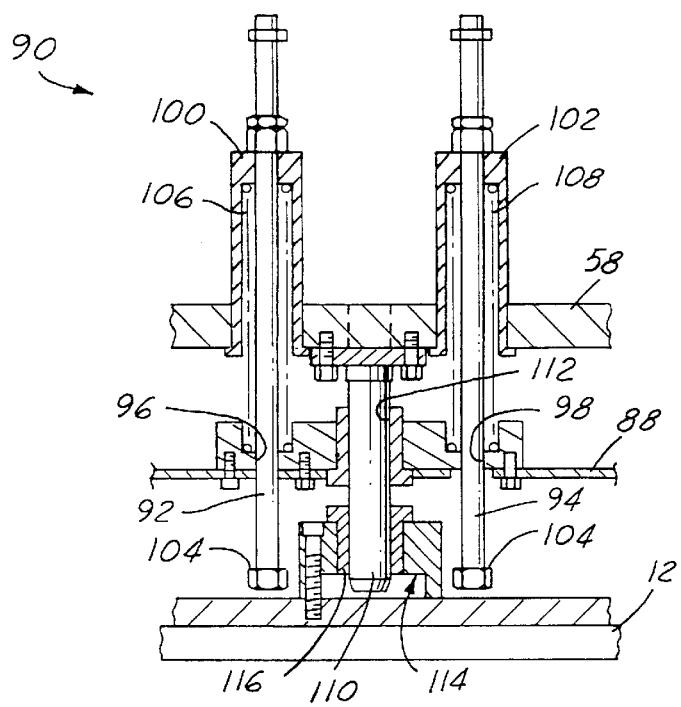
FIG. 4 is a fragmentary partial cross-sectional front view of the apparatus of FIGS. 1A and 1B showing a platform support of the apparatus.
Figure 5:
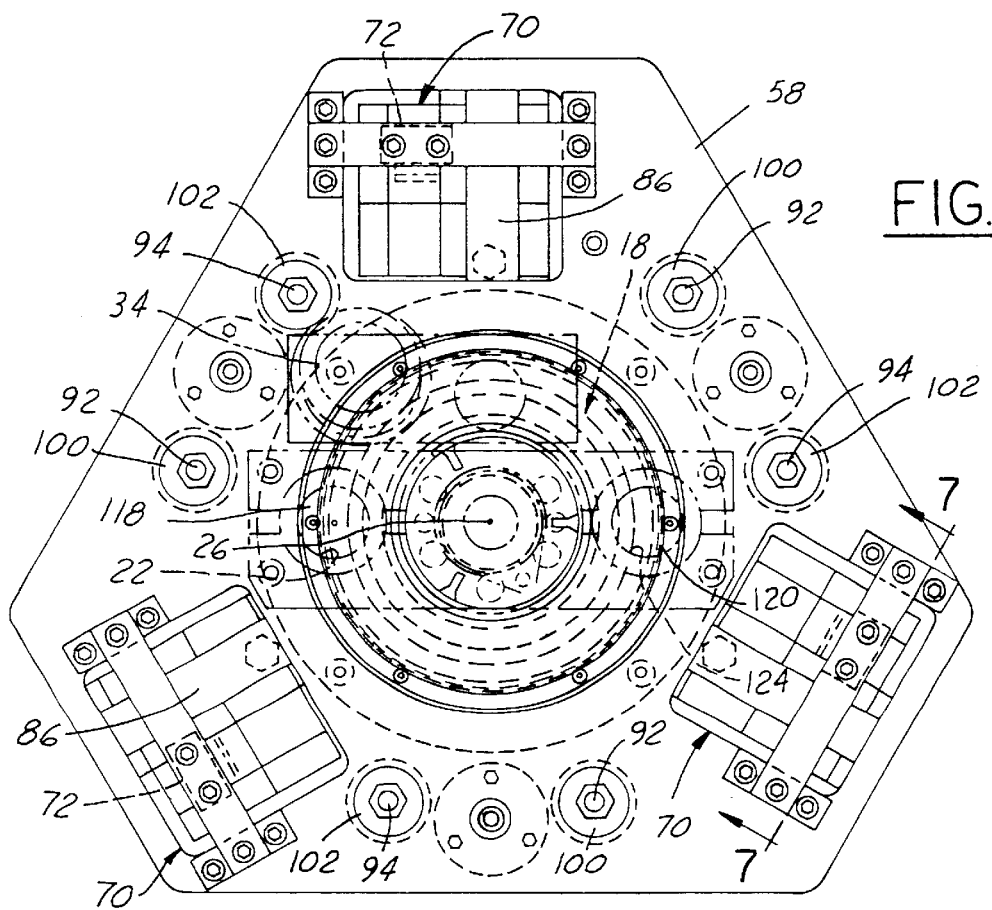
FIG. 5 is a partial cross-sectional top view of a head plate of the apparatus of FIGS. 1A and 1B.
Figure 11:
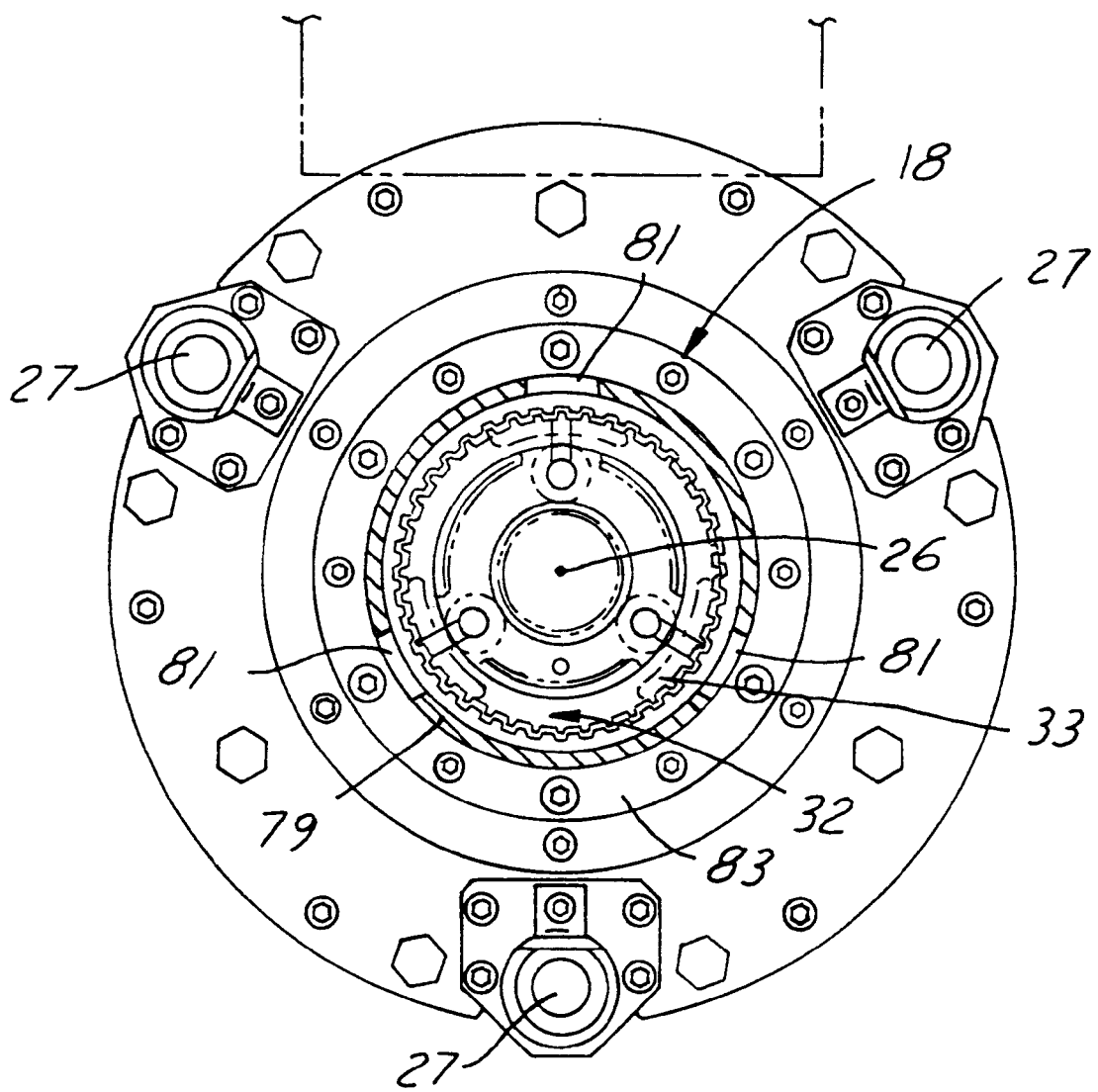
FIG. 11 is a top view of a lower tool of the apparatus of FIGS. 1A and 1B.

Three identical lower tools 18 are supported on the turntable 12 and are equally spaced around the turntable 12 adjacent in outer circumferential edge 20 of the turntable 12. As is best shown in FIG. 11, each of the lower tools 18 is roughly cylindrical in shape and is configured to support first and second workpieces 22, 24 for a coaxial rotation about a workpiece axis 26 that extends through the workpieces 22, 24. As best shown in FIG. 1B, each of the lower tools 18 is supported for rotation on one of three circular roller bearing rings 29. Each roller bearing ring 29 is supported on a fixture ring 31 that is connected to the turntable. As best shown in FIGS. 3A and 3B, an outer race of each bearing ring 29 is secured to its respective fixture ring 31 by a top clamp ring 35. An inner race of each bearing ring 29 is secured to its respective lower tool 18 by a bottom clamp ring 37. The radius of each bearing ring 29 is greater than the radius of the weld interface defined by workpieces 22, 24 supported on a corresponding lower tool 18.

A base rim 39 of each lower tool 18 includes a pair of diametrically opposed key slots 41 shaped to slidably engage a circular rail 43. The circular rail 43 is supported beneath the turntable 12 in a concentric position relative to the turntable axis 14 that allows the lower tools 18 to "ride" the rail 43 as the turntable 12 is rotated. The rail 43 thus causes the lower tool 18 to rotate once during each turntable revolution and prevents the lower tools 18 from "freewheeling", i.e., from rotating on their own.

The lower tool includes three vertically or axially-extending cylindrical anti-rotation pins 27 configured to be received into complementary openings in one or both workpieces 22, 24. In other embodiments, the configuration of the lower tools 18 and number and location of anti-rotation pins 27 may vary from that shown in the figures to complement the shapes and to securely engage workpieces of different shapes. The lower tool and turntable 12 support the workpieces 22, 24 for indexed movement along a circular workpiece path around the turntable axis 14 between a load station shown at 28 in FIG. 1B and a weld station shown at 30 in FIG. 1A.

The apparatus 10 also includes a workpiece rotary drive 32 that is operatively connectable to the lower tool 18 when the lower tool 18 is disposed at the weld station 30 along the circular path. The workpiece rotary drive 32 includes a pedestal 33 that engages and rotates the lower tool 18 about the workpiece axis 26. The pedestal 33 includes a diametrically oriented key 45 that extends integrally upward from an upper surface of the pedestal 33. The key 45 is shaped to engage both diametrically opposed key slots 41 of each lower tool 18 when each lower tool 18 is disposed at the weld station 30. The key 45 is both vertically and laterally aligned with the circular rail 43 and fits within a gap in the rail 43 at the weld station 30. Because the key 45 is aligned with the rail 4 the lower tools 18 slide off of the rail 43 and onto the key 45 when arriving at the weld station 30. With the key 45 thus engaged in the key slots 41, rotation of the pedestal 33 rotates whichever of the lower tools 18 is disposed at the weld station 30.

The laser emitter 34 is supported adjacent the weld station 30 on a horizontal beam 36 of a bridge structure 38. The laser emitter 34 includes optics configured to direct a laser beam 40 from a laser generator (not shown) toward a circular or semicircular interface between respective mating surfaces of the first and second workpieces 22, 24. The laser emitter 34 is configured to emit a beam of laser energy toward such an interface. The laser beam melts a portion of the first and second workpieces 22, 24 along their respective mating surfaces, welding the workpieces 22, 24 together. The resulting weld is either circular or semicircular in shape depending on the shape of the interface and whether or not the laser emitter 34 applied a laser beam to the workpieces 22, 24 continuously or intermittently as the workpiece rotary drive 32 rotated the lower tool about the workpiece axis 26. In either case, the resulting weld is coaxially disposed around the workpiece axis 26.

Figure 2:
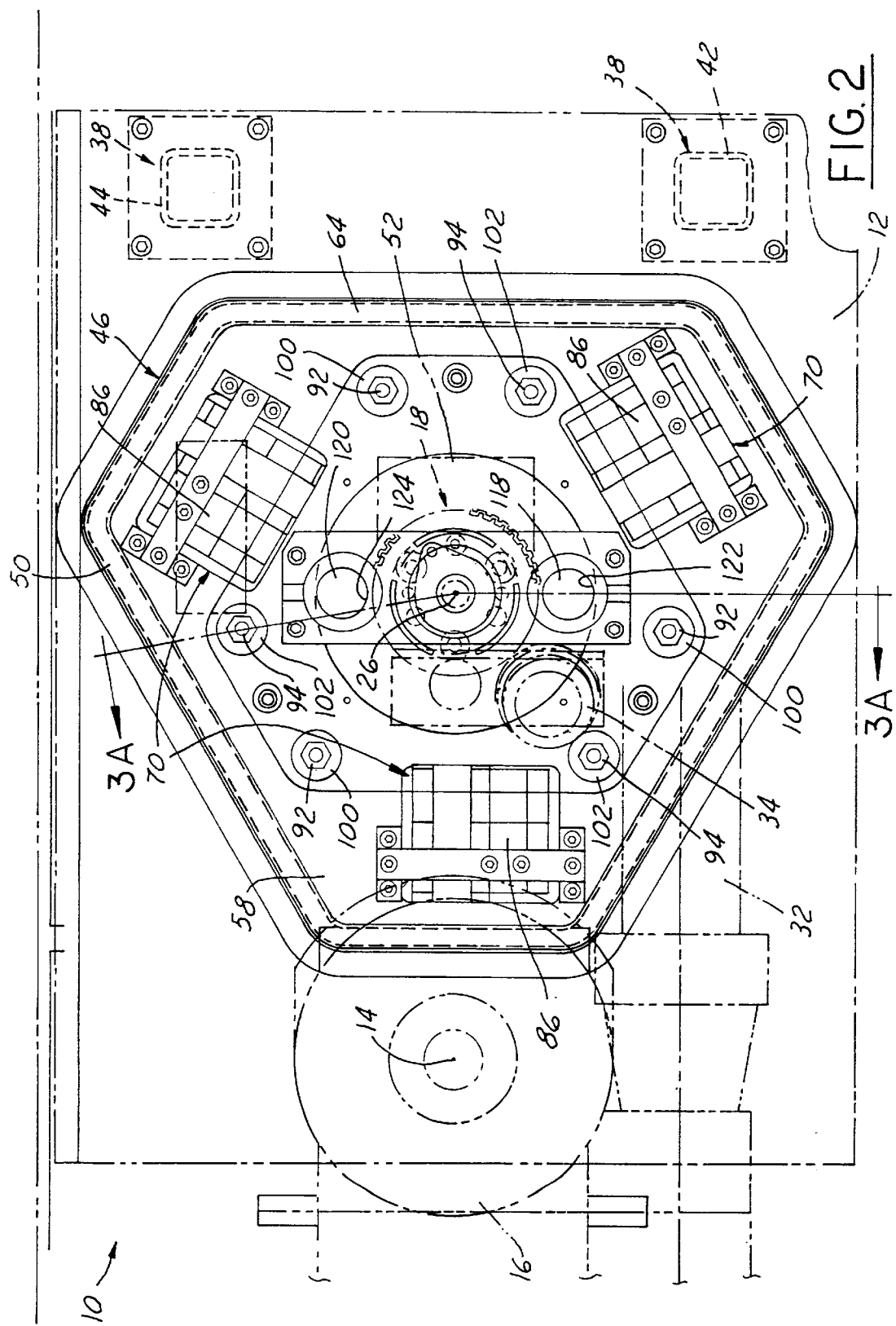
FIG. 2 is a partial cross-sectional top view of the apparatus of FIGS. 1A and 1B taken along line 2—2 of FIGS. 1A and 1B.

As described above, the horizontal portion of the bridge 38 comprises a laser emitter mount and is disposed vertically adjacent the weld station 30. As is best shown in FIG. 2, the bridge 38 includes a first support point 42 displaced latterly from the laser emitter 34. The bridge 38 also includes a second support point 44 spaced radially from the first support point 42 relative to the laser emitter 34. The use of two support points 42, 44 and the radial spacing of the support points 42, 44 improves welding accuracy by stabilizing the laser emitter 34 as the workpiece rotary drive 32 rotates the workpieces 22, 24 about the workpiece axis 26 during welding.

As is best shown in FIGS. 2, 3A and 3B, a shroud 46 is supported about the weld station 30 and includes interlocking upper and lower shroud portions 48, 50. The shroud 46 also includes a smaller, annular inner shroud ring 52 having a lower edge that rests on an upper surface of the uppermost of the two workpieces 22, 24 during welding. The lower shroud portion 50 is supported for axial movement between a retracted position separated from the upper shroud portion 48 and a cover position engaged with the upper shroud portion 48. In the retracted position, as shown in phantom in FIGS. 1A, 1B, 3A and 3B, the lower shroud portion 50 is axially spaced from the workpieces 22, 24 to be welded. In the cover position, shown in solid lines in the above Figures, the upper and lower shroud portions cooperate to conceal the interface of the workpiece mating surfaces.

An upper tool 54 is supported within an upper tool casing 53 for rotation about the workpiece axis 26. To allow the upper tool 54 to turn freely within the casing 53 a circumferential array of vertically-oriented needle bearings 57 is disposed between respective facing circumferential sidewalls of the upper tool 54 and the upper tool casing 53. The upper tool casing 53 and the upper tool 54 are supported on the bridge 38 for reciprocal axial movement between a retracted position and an engaged position. In the retracted position, shown in phantom in FIGS. 1A, 1B, 3A and 3B, the upper tool 54 is axially spaced from the workpieces 22, 24. In the engaged position, shown in solid lines in FIGS. 1A, 1B, 3A and 3B, a clamp ring 55 of the upper tool 54 axially abuts one of the workpieces 22, 24, cooperating with the lower tool to clamp the workpieces 22, 24 together. To allow the upper tool 54 to rotate freely while applying downward axial clamping forces to the workpieces 22, 24, a thrust bearing 59 is disposed between respective facing circumferential end surfaces of the upper tool 54 and the upper tool casing 53. A reciprocator 56 mounted on the horizontal portion of the bridge 38, as shown in FIG. 1A, is operatively connected to the upper tool 54 and drives the reciprocating axial movement of the upper tool 54.

The lower shroud portion 50 and the upper tool 54 are supported on a generally planar, general hexagonal head or head plate 58. The head 58 is supported on a horizontal beam 36 of the bridge 38 for reciprocal axial motion relative to the bridge 38. The reciprocal axial motion of the head 58 includes alternating downstrokes and upstrokes.

The upper shroud portion 48 is supported on the horizontal beam 36 portion of the bridge 38 in a position above and axially aligned with the lower shroud portion 50. The lower shroud portion 50 is supported on the head 58 and is configured to cooperate with the upper shroud portion 48 to seal the apparatus 10 against the escape of laser light during lasing by sealingly engaging the upper shroud portion 48 when the head 58 is at the end of its downstroke. A lower rim 60 of the upper shroud portion 48 includes an upwardly bent hem 62 and an upper rim 64 of the lower shroud portion 50 includes a downwardly bent hem 66 configured to engage the upwardly bent hem 62 of the upper shroud portion 48 when the head 58 is at the end of its downstroke.

Figure 6:
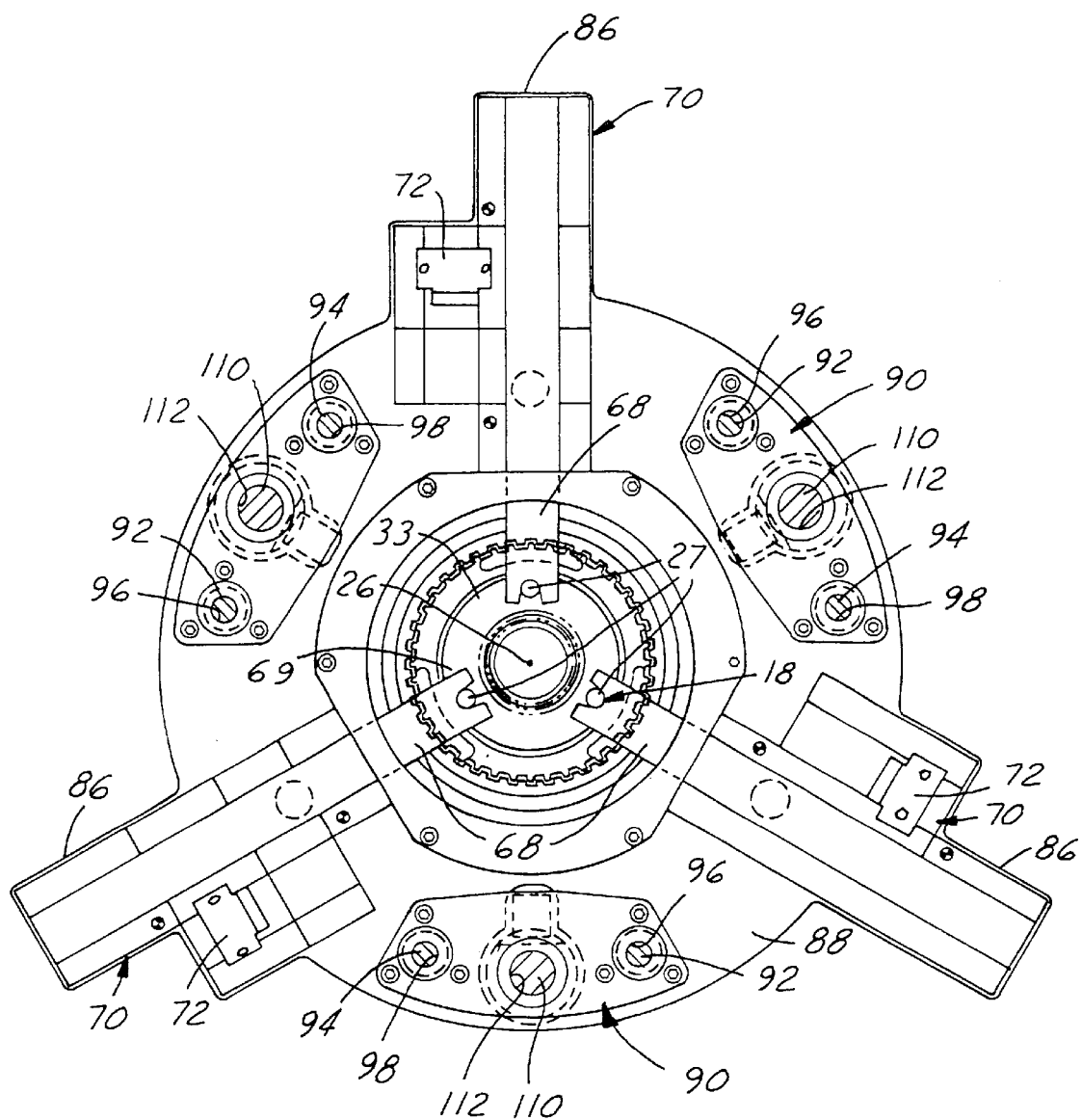
FIG. 6 is a partial cross-sectional top view of gage blocks, gage block drives, a lower die, a common platform and platform supports of the assembly of FIGS. 1A and 1B.

As best shown in FIG. 6, three identical gage blocks 68 are supported in circumferentially spaced positions around each of the three upper tools 54 for radial motion between a withdrawn position and an engaged position. In the withdrawn position the gage blocks 68 are spaced radially from the workpieces 22, 24. In the engaged position, a portion of a lower surface of each gage block 68 is disposed on a corresponding machined upper surface 69 of a workpiece 24 disposed on the lower tool 18. The three gage blocks 68 cooperate with the upper and lower tools 54, 18 to maintain a critical vertical tolerance between certain respective structures of the workpieces 22, 24 to be welded together. In other words, the gage blocks 68 insure that the workpieces 22, 24 are welded together in a proper vertical orientation and are positively located relative to one another. In other embodiments where the relative vertical orientation of upper and lower workpieces are not critical, the rotary welding apparatus 10 may not include guide blocks.

Figure 8:
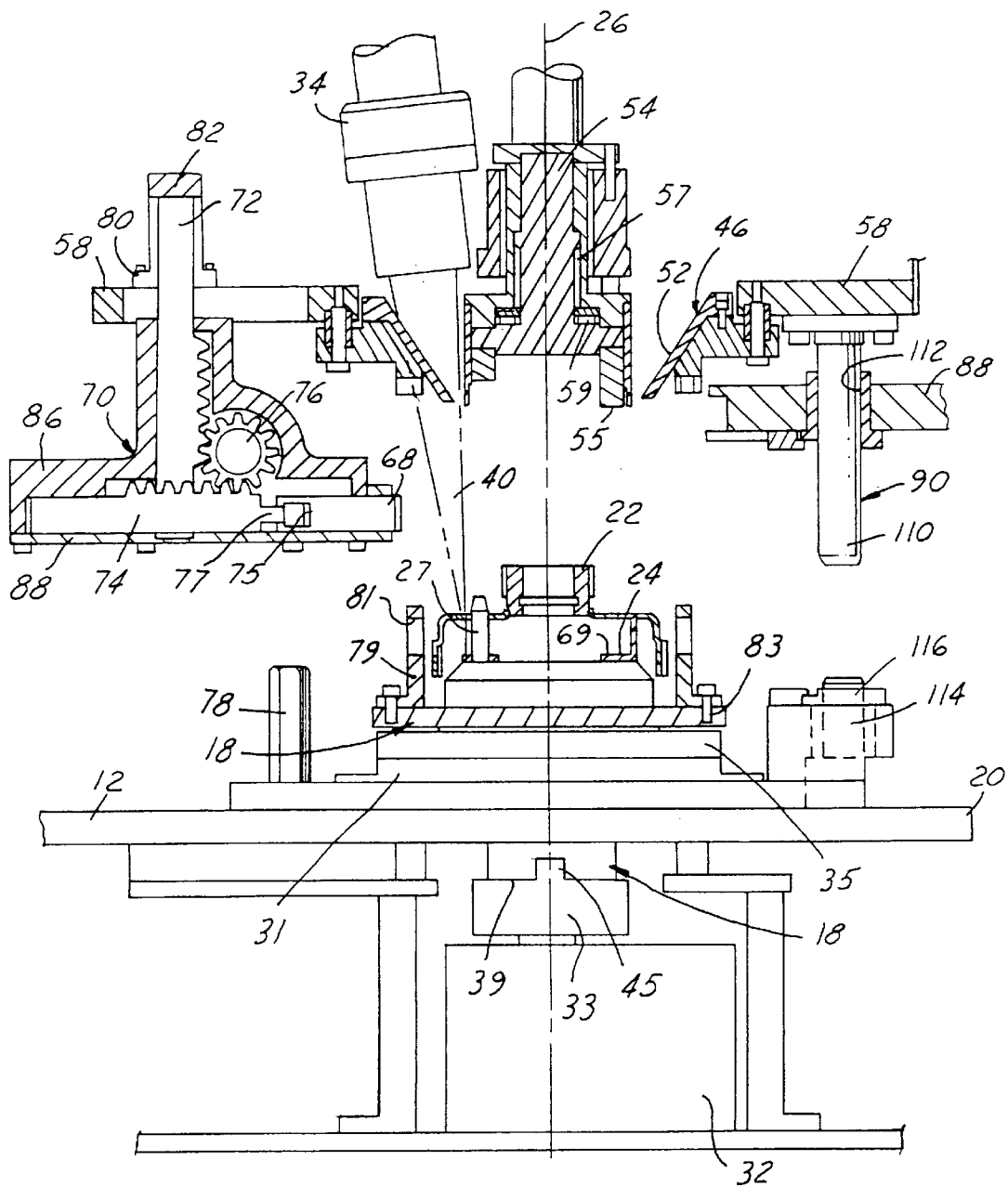
FIG. 8 is a broken-out partial cross-sectional front view of the region bounded by circle A in FIGS. 1A and 1B showing a head portion of the apparatus at the top of its downward stroke.
Figure 9:
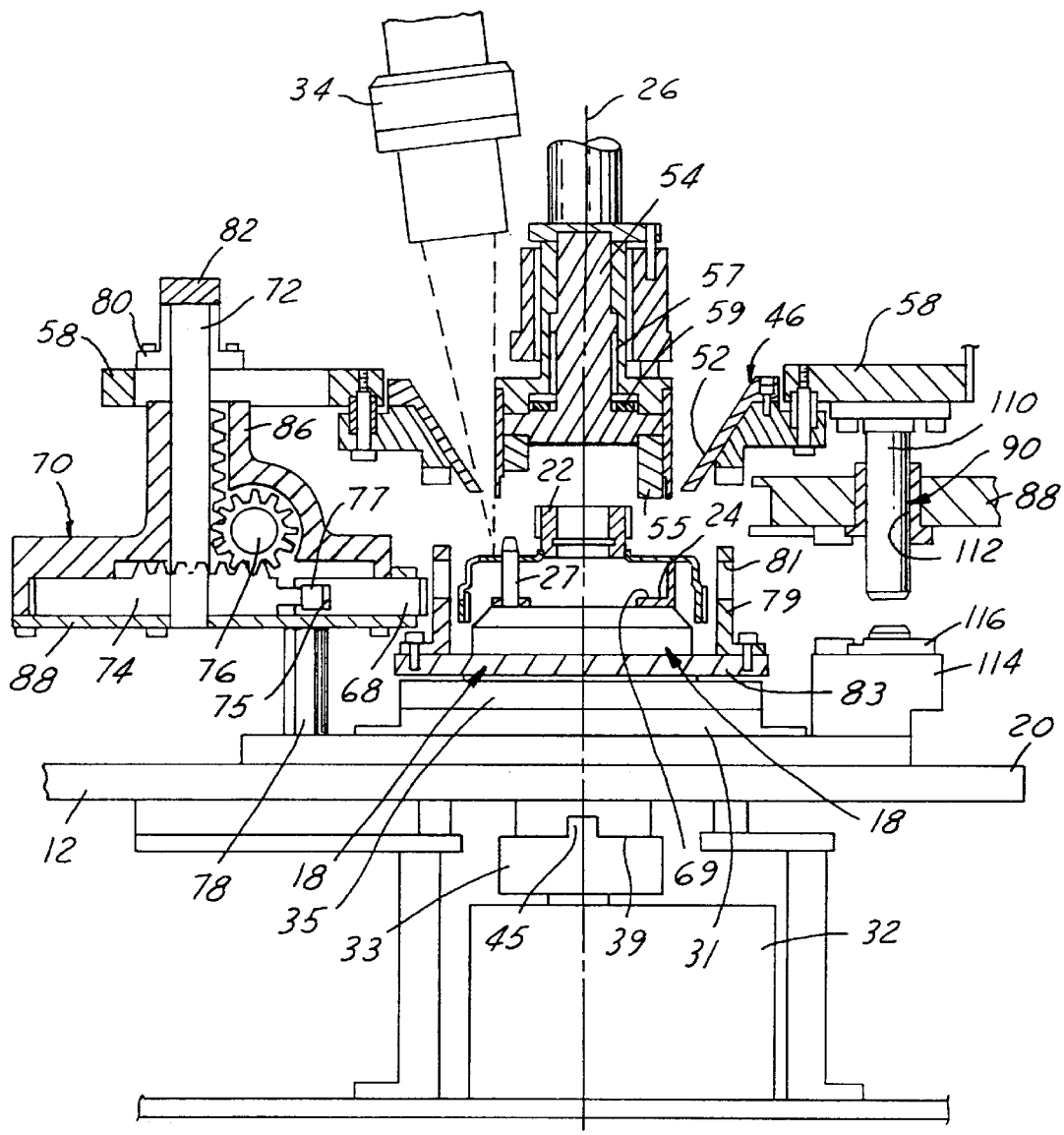
FIG. 9 is a broken-out partial cross-sectional front view of the region bounded by circle A in FIGS. 1A and 1B showing the head portion at the bottom of a first portion of its downward stroke.
Figure 10:
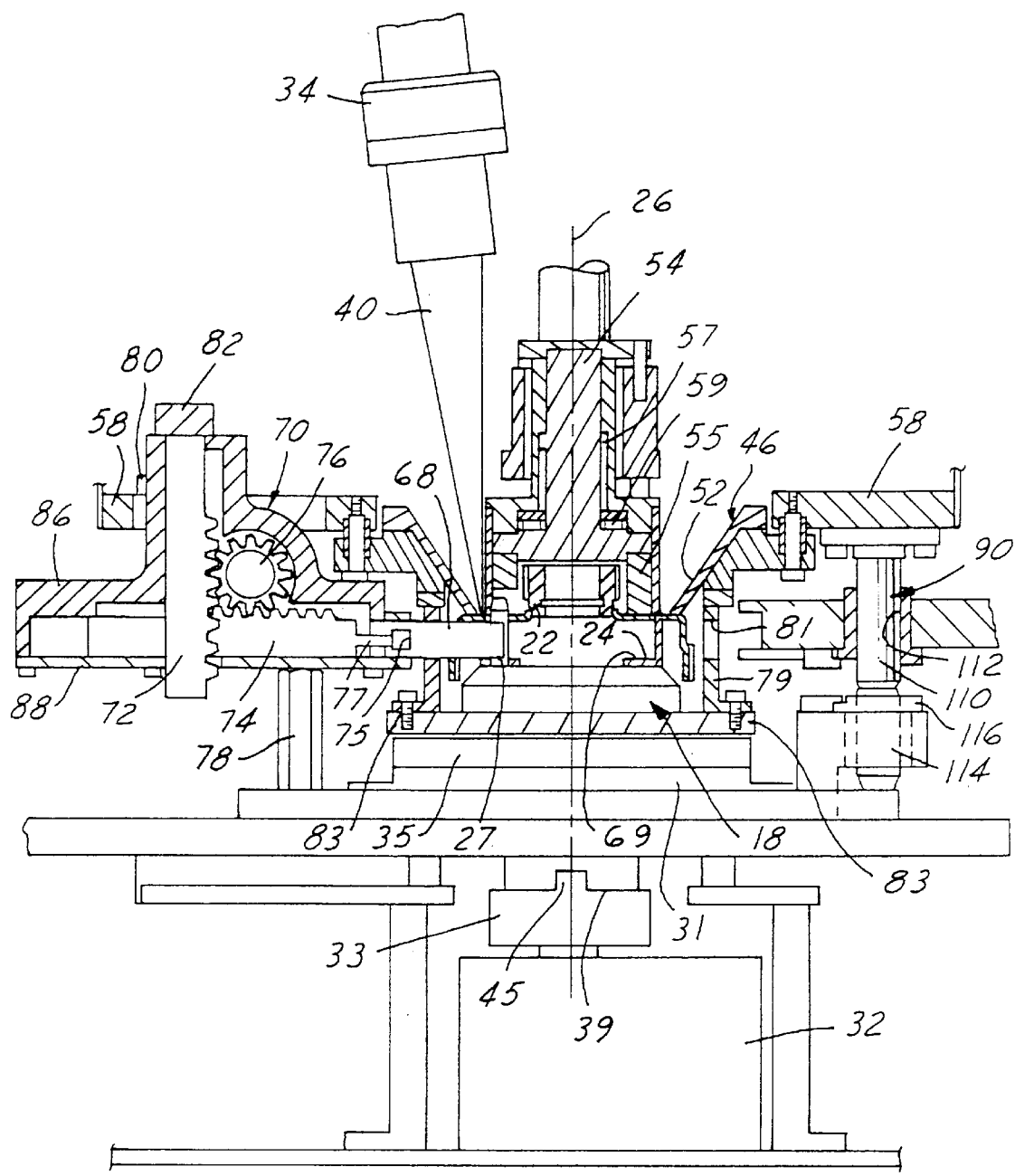
FIG. 10 is a broken-out partial cross-sectional front view of the region bounded by circle A in FIGS. 1A and 1B showing the head at the bottom of a second portion of its downward stroke.

In the present embodiment, each gage block 68 is operatively connected to the head 58 and is configured to advance laterally to its engaged position in response to each downstroke of the head 58. As is best shown in FIGS. 8 and 9, the gage blocks 68 are supported for downward axial motion with the head 58 for a first portion of each downstroke. FIG. 8 shows the position of the gage blocks 68 and the head 58 at the beginning of the first portion of a downstroke and FIG. 9 shows position of the gage block and the head 58 at the end of the first portion of a downstroke. The gage block is supported for lateral motion to the engaged position during a second portion of each downstroke as shown in FIG. 10.

Three identical gage block drives 70 operatively connect the respective gage blocks 68 to the head 58 and are each configured to convert head motion into lateral gage block motion during the second portion of each downstroke. As best shown in FIGS. 8 and 9 the gage block drive is supported on the head 58 for downward axial motion with the head 58 during the first part of each downstroke. Each gage block drive includes a driving element including a vertical toothed rack 72 that is operatively connected to a driven element. The driven element includes a horizontal toothed rack 74 and a pinion gear 76. The horizontal toothed rack 74 of each gage block drive is connected to a corresponding gage block 68 in an end-to-end disposition when the rotary drive 32 is not rotating the lower tool 18. A keeper knob 77 extends integrally from an inward end of each horizontal toothed rack 74 in a radially inward direction. Each gage block 68 includes a circumferentially-directed key slot 75 sized and positioned to engage any one of the keeper knobs 77 to allow the horizontal toothed racks 74 to drive the gage blocks 68 radially into and out of their respective engaged positions. Each key slot 75 is also sized and positioned to allow the keeper knobs 77 to pass through the key slots 75 when the rotary drive 32 is rotating the lower tool 18, the workpieces, and the gage blocks 68. The gage block key slots 75 are large enough to allow the keeper knobs 77 to pass through with sufficient clearance to prevent the knobs 77 from striking and dislodging the gage blocks 68 as the gage blocks 68 rotate with the lower tool 18 during welding. A gage block keeper ring 79 is supported on each of the three lower tools 18 to support the gage blocks 68 when the lower tools 18 are rotating and the keeper knobs 77 have released the gage blocks 68. Each gage block keeper ring 79 is concentrically supported on an outer circumferential flange 83 of one of the lower tools 18. Each keeper ring 79 includes three rectangular through holes 81 sized to slidably receive respective ones of the gage blocks 68 as the gage block drives 70 push the gage blocks axially inward to their respective engaged positions.

The driving element, i.e., the vertical rack 72 of each gage block drive is connected to and is downwardly movable with the head 58 during both the first and second portions of each downstroke. Three stops 78 are supported on the turntable 12 in respective positions adjacent the three lower tools 18. Each of the three stops 78 is a vertically oriented post having a flat upper end surface and a hexagonal cross-section. Each stop 78 is positioned to arrest downward motion of the gage blocks 68 and a driven element of the gage block drive at the end of the first portion of each downstroke as shown in FIG. 9. The driven element of the gage block drive is configured to convert subsequent relative axial motion between the driving element and the arrested driven element during the second portion of each downstroke into lateral gage block motion to the respective engaged positions as shown in FIG. 10.

Figure 7:
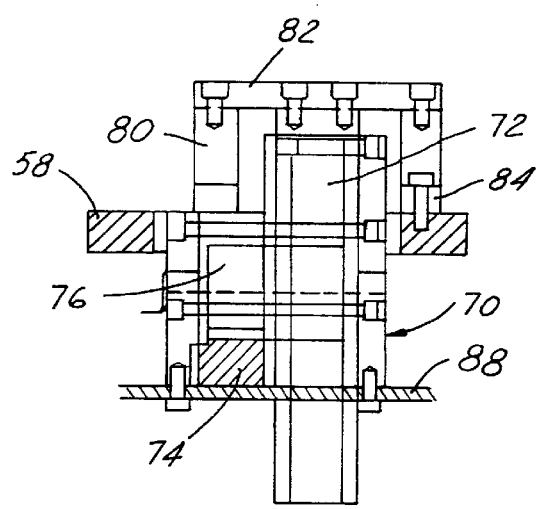
FIG. 7 is a fragmentary partial cross-sectional side view of a gage block drive mounted on a head platform of the apparatus of FIGS. 1A and 1B taken along line 7—7 of FIG. 5.

The vertical rack 72 of the driving element of each gage block drive is fixed to the head 58 as best shown in FIGS. 7 through 9. Three generally rectangular metal blocks 80, 82, 84 are fastened together to form a bridge structure that is disposed over an upper end of the vertical rack 72. The bridge structure is fastened to the upper end of the vertical rack 72 and to an upper surface of the head 58. The pinion 76 includes radially extending teeth meshed with teeth extending vertically from the horizontal tooth rack 74. Laterally extending teeth of the vertical rack 72 are also meshed with the pinion teeth. Consequently, downward motion of the head 58 during the second portion of each downstroke causes the vertical rack 72 of each gage block drive to move downward and to turn their respective pinions 76. The resulting rotation of the pinions 76 drives the respective horizontal racks 74 and corresponding gage blocks 68 laterally. On upstrokes of the head 58, following welding, the head 58 pulls the vertical racks 72 upward, turning the pinions 76 in the opposite direction and withdrawing the horizontal racks 74 and gage blocks 68. This moves the gage blocks 68 from their respective engaged positions and into their respective disengaged positions. As the head 58 continues upward to the top of its upstroke it carries the gage blocks 68 and the gage blocks 68 with it and lifts them, along with the upper tool 54, clear of the workpieces 22, 24.

The racks 72, 74 and the pinions 76 of the gage block drives 70 are housed in respective gearboxes 86. The gearboxes 86 are supported on a common platform 88 that is suspended from the head 58 by three platform supports 90. The platform supports 90 are connected to the head 58 and extend between the head 58 and the platform 88. The platform supports 90 are configured to support the platform 88 from the head 58 in a suspended position during the first portion of each downstroke. The platform supports 90 are also configured to guide axial relative motion between the platform 88 and the head 58 during the second portion of each downstroke between suspended position and a compressed position adjacent the head 58. The suspended position is best shown in FIGS. 8 and 9 and the compressed position is best shown in FIG. 10. Each platform support 90 includes two parallel, vertically oriented support shafts 92, 94 received in and passing through corresponding circular apertures 96, 98 in the platform 88. An upper end of each support shaft 92, 94 is fixed to the head 58 by respective upwardly extending generally cylindrical spring housings 100, 102. A lower end of each support shaft 92, 94 includes a stop detent in the form of a radially extending flange 104. The flanges 104 support the platform 88 in its suspended position. Each platform support 90 includes two springs 106, 108 concentrically disposed on respective support shafts 92, 94 and within respective spring housings 100, 102. The springs 106 are disposed between the head 58 and the platform 88 to axially spring bias the platform 88 toward the suspended position below the head 58.

Each platform support 90 includes an elongated cylindrical guide pin 110 fastened to a lower surface of the head 58 and extending vertically downward through a guide pin opening 112 disposed in the platform 88. The guide pin opening 112 in the platform 88 axially and slidably receives the guide pin 110 and allows the guide pin 110 to slide downward through the opening as the head 58 moves downward during the second portion of its downstroke. This helps to positively locate the platform 88 and gage blocks 68 relative to the head 58.

Each platform support 90 also includes a guide pin receptacle 114 supported on an upper surface of the turntable 12. The guide pin receptacles 114 each include a locator bushing 116 positioned to axially receive the guide pin 110 as the head 58 approaches the end of its downstroke. The guide pin receptacles 114 help to positively locate the platform 88 and gage blocks 68 relative to the turntable 12, a lower tool and the workpieces 22, 24.

Two vertically oriented parallel guide rods 118, 120 have respective upper ends supported on the cross beam portion 36 of the bridge 38. The head 58 includes corresponding through holes 122, 124 configured and positioned to slidably receive the respective vertical guide rods 118, 120. The head 58 is therefore slidably supported on the guide rods 118, 120 for generally vertical receptacle movement.

In practice, metallic workpieces 22, 24 can be welded together along circular or semicircular interfaces by stacking two workpieces 22, 24 in vertically adjacent coaxial positions on one of the three lower tools 18 on the turntable 12 at the load position. The turntable drive 16 then indexes the turntable 12 until the workpieces 22, 24 are positioned at the welding station. The guide rail 43 maintains a proper rotational orientation of the lower tool 18 and workpieces 22, 24 as the turntable 12 rotates. As the lower tool 18 reaches the welding station, the diametrically opposed key slots 41 of the lower tool 18 slide off the guide rail 43 and onto the pedestal key 45 of the workpiece rotary drive 32. At approximately the same time, the head 58 moves downward on its downstroke, carrying with it the lower portion of the shroud 46 and the upper tool 54. As the head 58 advances downward on the second portion of its downstroke the hem 66 of the lower shroud portion 50 engages the hem 62 of the upper shroud portion 48 and the inner shroud ring 52 engages an upper surface of an uppermost one of the two workpieces 22, 24.

Also during the second portion of the downstroke, relative motion between the head 58 and the platform 88 drives the vertical racks 72 of the three gage block drives 70 downward. The downward motion of the vertical racks 72 turns respective pinion gears 76 which causes the respective horizontal racks 74 to advance radially inward driving the gage blocks 68 through the gage block keeper ring 79 and into their respective engaged positions. At the end of the second portion of the downstroke, the clamp ring 54 on the upper tool 54 clamps down on the upper workpiece 22 thereby clamping the gage blocks 68 onto the machined surface 69 of the lower workpiece 24.

The workpiece rotary drive 32 then rotates the lower tool about the workpiece axis 26 as the laser generator provides a laser beam to the laser optics portion of the laser emitter 34 and the laser emitter 34 directs the laser beam at the interface of the workpiece meeting surfaces. As the workpiece rotary drive 32 rotates the workpieces 22, 24 about the workpiece axis 26, the laser beam forms a single circular weld or a series spaced-apart semicircular welds along the interface of the workpiece mating surfaces.

Once the workpieces 22, 24 have been welded together, the rotary drive ceases rotation with the pedestal key 45 aligned with the guide rail 43 and disposed within the gap in the guide rail 43. At about the same time, the head 58 moves upward on its upstroke. During the first portion of the upstroke relative motion between the head 58 and the platform 88 causes the vertical racks 72 of the gage block drives 70 to move upwards relative to the driven elements of the gage block drives 70 which causes the respective pinion gears 76 to rotate and the respective horizontal racks 74 to move radially outwards, drawing with them the gage blocks 68. Once the gage blocks 68 have been fully withdrawn, the remainder of the upstroke carries the gage block drives 70 upward with the head 58 and the lower portion of the shroud 46 until they are clear of the workpieces 22, 24. The turntable drive 16 then indexes the turntable 12 to move the welded workpieces 22, 24 to an unload position which may or may not be the same as the load position. As the turntable 12 begins to rotate the lower tool 18 slides onto the guide rail 43 which again maintains the lower tool 18 in a proper rotational orientation. Once the lower tool 18 reaches the unload position the welded workpieces 22, 24 are removed from the lower tool 18.

This description is intended to illustrate certain embodiments of the invention rather then to limit the invention. Therefore, descriptive rather than limiting words are used. Obviously, it's possible to modify this invention from what the description teaches. Within the scope of the claims, one may practice the invention other then as described.

What is claimed is:

1. A rotary welding apparatus for joining two metallic workpieces together by forming a circular or semi-circular weld at a semi-circular interface formed at mating surfaces of the workpieces, the apparatus comprising:
   a lower tool configured to support first and second workpieces for coaxial rotation about a workpiece axis extending through the workpieces;
   a workpiece rotary drive operatively connectable to the lower tool and configured to rotate the lower tool about the workpiece axis;
   a laser emitter supported adjacent the workpiece axis and configured to direct a laser beam at a circular or semi-circular interface between respective mating surfaces of the first and second workpieces such that the laser beam melts the first and second workpieces along the respective mating surfaces and welds the first and second workpieces together forming a circular or semi-circular weld along the circular or semi-circular interface as the workpiece rotary drive rotates the lower tool about the workpiece axis, the weld being coaxially disposed around the workpiece axis;
   a laser emitter mount disposed adjacent the workpiece axis and having a first support point displaced laterally from the laser emitter and supporting the laser emitter adjacent the workpiece axis in a position directing a laser beam at the interface of the workpiece mating surfaces as the workpiece rotary drive rotates the workpieces about the workpiece axis; and
   the laser emitter mount having a second support point spaced radially from the first support point relative to the laser emitter to stabilize the laser emitter and thereby improve welding accuracy.

2. A rotary welding apparatus as defined in claim 1 in which:
   the apparatus includes a turntable supported for rotation about a turntable axis and rotatably driven by a turntable drive;
   the lower tool is supported on the turntable;
   the turntable and lower tool support the workpieces for indexed movement along a circular workpiece path around the turntable axis between a load station and a weld station;
   the workpiece rotary drive is operatively connectable to the lower tool when the lower tool is disposed at the weld station along the circular path; and
   the laser emitter mount and laser emitter are supported adjacent the weld station.

3. A rotary welding apparatus as defined in claim 1 in which a shroud is supported above the weld station, at least a portion of the shroud being supported for axial movement between a retracted position axially spaced from the workpieces to be welded and a cover position concealing the interface of the workpiece mating surfaces.

4. A rotary welding apparatus as defined in claim 3 in which an upper tool is supported for reciprocal axial movement between a retracted position axially spaced from the workpieces and an engaged position axially abutting one of the workpieces and sandwiching the workpieces between the upper tool and the lower tool, the upper tool being supported for rotational motion about the workpiece axis.

5. A rotary welding apparatus as defined in claim 4 in which the shroud and upper tool are supported on a head that is supported on a stationary bridge mount for reciprocal axial motion relative to the bridge mount including alternating down strokes and up strokes.

6. A rotary welding apparatus as defined in claim 1 in which a gage block is supported radially adjacent the workpieces for generally lateral motion between a withdrawn position spaced laterally from the workpieces and an engaged position in which a portion of a lower surface of the gage block is disposed on an upper surface of a workpiece disposed on the lower tool.

7. A rotary welding apparatus as defined in claim 6 in which the gage block is movable from the withdrawn to the engaged position in response to downward axial movement of the upper tool.

8. A rotary welding apparatus as defined in claim 7 in which the gage block is operatively connected to the head and is configured to move laterally to the engaged position in response to each down stroke.

9. A rotary welding apparatus as defined in claim 8 in which the gage block is supported for downward axial motion with the head for a first portion of each down stroke and lateral motion to the engaged position for a second portion of each down stroke.

10. A rotary welding apparatus as defined in claim 9 in which a gage block drive operatively connects the gage block to the head and is configured to convert axial head motion into lateral gage block motion during the second portion of each down stroke.

11. A rotary welding apparatus as defined in claim 10 in which:
    the gage block drive is supported on the head for downward axial motion with the head during the first part of each down stroke; the gage block drive includes a driving element operatively connected to a driven element that is operatively connected to the gage block;
    the driving element of the gage block drive is connected to and is downwardly movable with the head during both the first and second portions of each down stroke;
    a stop is supported in a position to arrest downward motion of the gage block and the driven element of the gage block drive at the end of the first portion of each down stroke; and
    the driven element of the gage block drive is configured to convert subsequent relative axial motion between the driving element and the arrested driven element during the second portion of each down stroke into lateral gage block motion to the engaged position.

12. A rotary welding apparatus as defined in claim 11 in which:
    the driven element of the gage block drive includes a horizontal toothed rack connected to the gage block and a pinion having teeth meshed with teeth extending vertically from the horizontal toothed rack; and
    the driving element of the gage block drive includes a vertical toothed rack fixed to the head and having laterally extending teeth meshed with the pinion.

13. A rotary welding apparatus as defined in claim 10 in which the apparatus includes:
- a second gage block connected to a second gage block drive;
- a common platform that supports the gage blocks and gage block drives; and
- at least two platform supports that extend between the head and the platform and are configured to support the platform from the head in a suspended position during the first portion of each down stroke and to guide axial relative motion between the platform and the head during the second portion of each down stroke between the suspended position and a compressed position adjacent the head.

14. A rotary welding apparatus as defined in claim 13 in which the platform is axially spring-biased toward the suspended position.

15. A rotary welding apparatus as defined in claim 14 in which each platform support includes a support shaft slidably received in a corresponding aperture in the platform and including an upper end fixed to the head and including a stop detent disposed at a lower end of each support and positioned to support the platform in the suspended position.

16. A rotary welding apparatus as defined in claim 15 in which each platform support includes a spring concentrically disposed on the support shaft between the head and the platform.

17. A rotary welding apparatus as defined in claim 16 in which each platform support includes:
- a guide pin supported on one of the head and the platform; and
- a guide pin receptacle disposed in the other of the head and platform in a position to axially receive the guide pin as the head moves downward during the second portion of its down stroke.

18. A rotary welding apparatus as defined in claim 17 in which a guide pin receptacle is disposed on the turntable in a position to axially receive the guide pin as the head approaches the end of its down stroke.

19. A rotary welding apparatus as defined in claim 5 in which:
- a first generally vertical guide rod is supported on the bridge mount; and
- the head is slidably supported on the first guide rod for generally vertical reciprocal movement.

20. A rotary welding apparatus as defined in claim 19 in which:
- a second generally vertical guide rod is supported on the bridge mount; and
- the had is slidably supported in the second guide rod for generally vertical reciprocal movement.

21. A rotary welding apparatus as defined in claim 5 in which the bridge mount comprises the laser emitter mount.

22. A rotary welding apparatus for joining two metallic workpieces together by forming a circular or semi-circular weld at a semi-circular interface formed at mating surfaces of the workpieces, the apparatus comprising:
- a lower tool configured to support first and second workpieces for coaxial rotation about a workpiece axis extending through the workpieces;
- a workpiece rotary drive operatively connectable to the lower tool along the circular path and configured to rotate the lower tool about the workpiece axis;
- a laser emitter supported adjacent the workpiece axis and configured to direct a laser beam at a circular or semi-circular interface between respective mating surfaces of the first and second workpieces such that the laser beam melts the first and second workpieces along the respective mating surfaces and welds the first and second workpieces together forming a circular or semi-circular weld along the circular or semi-circular interface as the workpiece rotary drive rotates the lower tool about the workpiece axis, the weld being coaxially disposed around the workpiece axis; and
- a shroud is supported above the lower tool, at least a lower shroud portion of the shroud being supported for axial movement between a retracted position axially spaced from the workpieces to be welded and a cover position concealing the interface of the workpiece mating surfaces to protect the eyes of operators and bystanders from reflected laser energy produced while welding the workpieces together without having to first move the workpieces into a shroud.

23. A rotary welding apparatus as defined in claim 22 in which an upper tool is supported for reciprocal axial movement between a retracted position axially spaced from the workpieces and an engaged position axially abutting one of the workpieces and sandwiching the workpieces between the upper tool and the lower tool, the upper tool being supported for rotational motion about the workpiece axis.

24. A rotary welding apparatus as defined in claim 23 in which the lower shroud portion and upper tool are supported on a head that is supported on a stationary bridge mount for reciprocal axial motion relative to the bridge mount including alternating down strokes and up strokes.

25. A rotary welding apparatus as defined in claim 24 in which the bridge mount supports the laser emitter in a position directing a laser beam at the interface of the workpiece mating surfaces as the workpiece rotary drive rotates the workpieces about the workpiece axis, the mount including a first support point displaced laterally from the laser emitter and a second support point spaced radially from the first support point relative to the laser emitter.

26. A rotary welding apparatus as defined in claim 25 in which the apparatus includes an upper shroud portion supported on the bridge mount above and axially aligned with the lower shroud portion, the lower shroud portion being supported on the head and configured to cooperate with the upper shroud portion to seal the apparatus against the escape of laser light during lasing by sealingly engaging the upper shroud portion when the head is at the end of its down stroke.

27. A rotary welding apparatus as defined in claim 26 in which a lower rim of the upper shroud portion includes an upwardly-bent hem and an upper rim of the lower shroud portion includes a downwardly-bent hem configured to engage the upwardly-bent hem of the upper shroud portion when the head is at the end of its down stroke.

28. A rotary welding apparatus for joining two metallic workpieces together by forming a circular or semi-circular weld at a semi-circular interface formed at mating surfaces of the workpieces, the apparatus comprising:
- a lower tool supported on a movable platform and configured to support first and second workpieces for coaxial rotation about a workpiece axis extending through the workpieces, the platform and lower tool supporting the workpieces for indexed movement along a workpiece path between a load station and a weld station;
- a workpiece rotary drive operatively connectable to the lower tool when the lower tool is disposed at the weld station, the workpiece rotary drive being configured to rotate the lower tool about the workpiece axis;

a laser emitter supported adjacent the weld station and configured to direct a laser beam at a circular or semi-circular interface between respective mating surfaces of the first and second workpieces such that the laser beam melts the first and second workpieces along the respective mating surfaces and welds the first and second workpieces together forming a circular or semi-circular weld along the circular or semi-circular interface as the workpiece rotary drive rotates the lower tool about the workpiece axis, the weld being coaxially disposed around the workpiece axis; and a bearing ring supported on the movable platform and supporting the lower tool for rotation about the workpiece axis.

29. A rotary welding apparatus as defined in claim 28 in which:

the movable platform is a turntable supported for rotation about a turntable axis and rotatably driven by a turntable drive; and the workpiece path is circular and is coaxially oriented around the turntable axis.

30. A rotary welding apparatus as defined in claim 28 in which a radius of the bearing ring is greater than that of the interface.

31. A rotary welding apparatus as defined in claim 28 further including a laser emitter mount disposed adjacent the weld station and supporting the laser emitter adjacent the weld station in a position directing a laser beam at the interface of the workpiece mating surfaces as the workpiece rotary drive rotates the workpieces about the workpiece axis, the mount including a first support point displaced laterally from the laser emitter and a second support point spaced radially from the first support point relative to the laser emitter.

32. A rotary welding apparatus as defined in claim 28 in which a shroud is supported above the weld station, at least a lower shroud portion of the shroud being supported for axial movement between a retracted position axially spaced from the workpieces to be welded and a cover position concealing the interface of the workpiece mating surfaces.

33. A rotary welding apparatus as defined in claim 28 further including an upper tool supported for reciprocal axial movement between a retracted position axially spaced from the workpieces and an engaged position axially abutting one of the workpieces and sandwiching the workpieces between the upper tool and the lower tool, the upper tool being supported for rotational motion about the workpiece axis.

34. A rotary welding apparatus as defined in claim 32 in which the lower shroud portion and upper tool are supported on a head that is supported on a stationary bridge mount for reciprocal axial motion relative to the bridge mount including alternating down strokes and up strokes.

35. A rotary welding apparatus as defined in claim 34 further including an upper shroud portion supported on the bridge mount above and axially aligned with the lower shroud portion, the lower shroud portion being supported on the head and configured to cooperate with the upper shroud portion to seal the apparatus against the escape of laser light during lasing by sealingly engaging the upper shroud portion when the head is at the end of its down stroke.

36. A rotary welding apparatus as defined in claim 35 in which a lower rim of the upper shroud portion includes an upwardly-bent hem and an upper rim of the lower shroud portion includes a downwardly-bent hem configured to engage the upwardly-bent hem of the upper shroud portion when the head is at the end of its down stroke.

* * * * *

UNITED STATES PATENT AND TRADEMARK OFFICE
CERTIFICATE OF CORRECTION

PATENT NO.    : 6,369,352 B1                                   Page 1 of 1
DATED         : April 9, 2002
INVENTOR(S)   : Gary A. Aman et al.

It is certified that error appears in the above-identified patent and that said Letters Patent is hereby corrected as shown below:

<u>Column 11,</u>
Line 50, change "had" to -- head --.

Signed and Sealed this

Eighteenth Day of June, 2002

Attest:

Attesting Officer

JAMES E. ROGAN
*Director of the United States Patent and Trademark Office*